United States Patent [19]

Morrison

[11] Patent Number: 5,459,534
[45] Date of Patent: Oct. 17, 1995

[54] MODULAR UNIVERSAL EYEGLASS FRAME

[75] Inventor: James W. Morrison, Sarasota, Fla.

[73] Assignee: Morrison International, Inc., Sarasota, Fla.

[21] Appl. No.: 155,206

[22] Filed: Nov. 22, 1993

[51] Int. Cl.⁶ .................................................. G02C 5/04
[52] U.S. Cl. .............................. 351/128; 351/41; 351/124
[58] Field of Search .............................. 351/128, 91, 90, 351/124, 125, 41, 98, 138, 137, 65, 76

[56] References Cited

U.S. PATENT DOCUMENTS

| | | | |
|---|---|---|---|
| 1,750,630 | 3/1930 | Day | 351/128 |
| 2,389,428 | 11/1945 | Glasser | 351/128 |
| 2,856,813 | 10/1958 | Kudelko | 351/128 |
| 4,768,872 | 9/1988 | Fraselle et al. | 351/128 |
| 5,323,189 | 6/1994 | Conterar | 351/128 |

Primary Examiner—William L. Sikes
Assistant Examiner—Hung Xuan Dang
Attorney, Agent, or Firm—Robert A. Green

[57] ABSTRACT

The disclosure is of an eyeglass frame having two lens receiving portions removably coupled to a coupling member which permits the spacing between the two lens receiving portions to be adjusted. The lens receiving portions have markings and notches to permit the proper placement of a lens therein and these portions are selectively prepared to present a non-circular appearance even though they receive circular lenses.

4 Claims, 3 Drawing Sheets

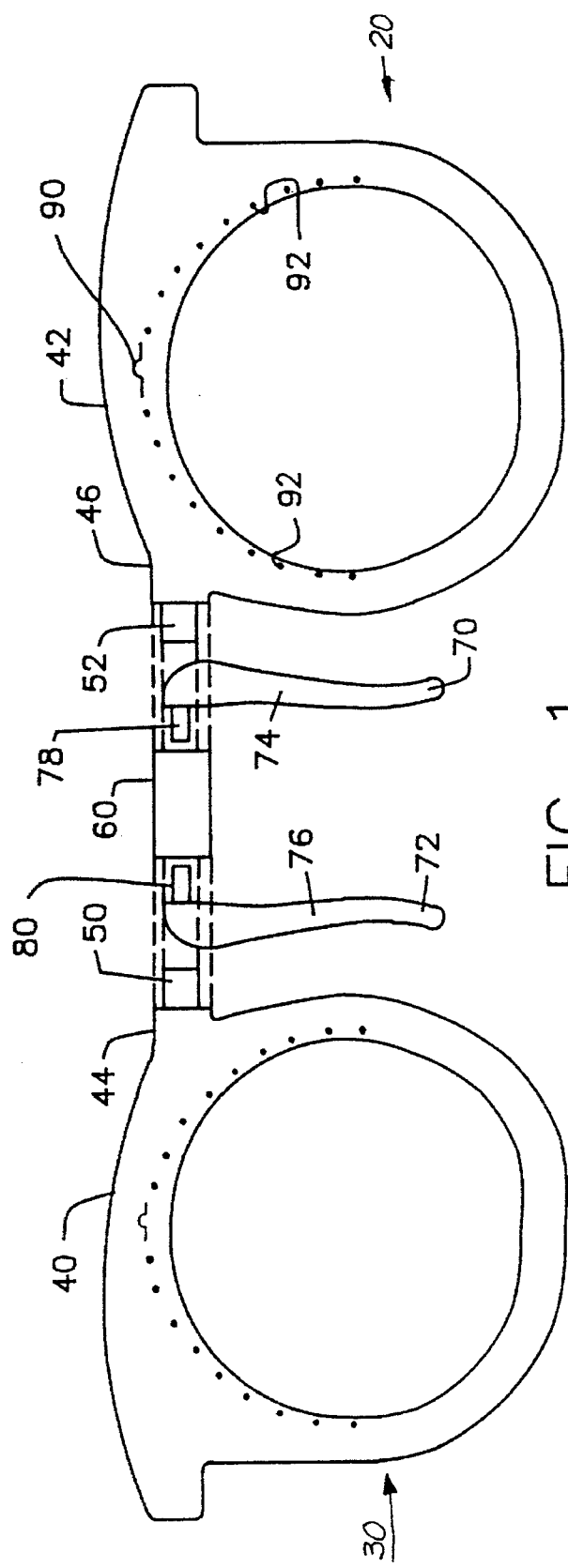
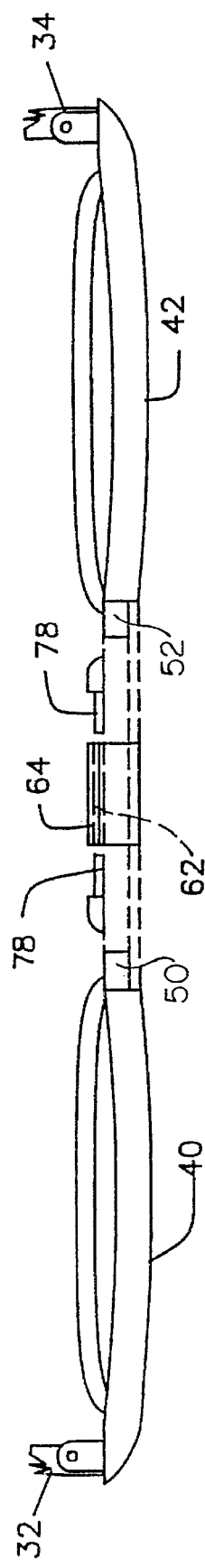
FIG. 1
FIG. 2

MODULAR UNIVERSAL EYEGLASS FRAME

BACKGROUND OF THE INVENTION

At the present time, commercially available eyeglass frames are made in standard sizes and shapes and cannot be adjusted to any great extent to accommodate the variations in face shapes and sizes and eye spacings and pupillary dimensions of different wearers. This is not a problem in civilized countries in which purveyors of frames have many different sizes and shapes readily available. However, in third world countries or in remote areas of any country a variety of eyeglasses and frames may not be available.

SUMMARY OF THE INVENTION

The present invention provides eyeglass frames which are completely adjustable in size and shape and which can accept round lenses of different prescriptions.

The invention also provides eyeglass frames which simplify accommodation for astigmatism.

DESCRIPTION OF THE DRAWINGS

FIG. 1 is a rear elevational view of a modular eyeglass frame embodying the invention;

FIG. 2 is a plan view of the frame of FIG. 1;

DESCRIPTION OF THE INVENTION

Figure 3:
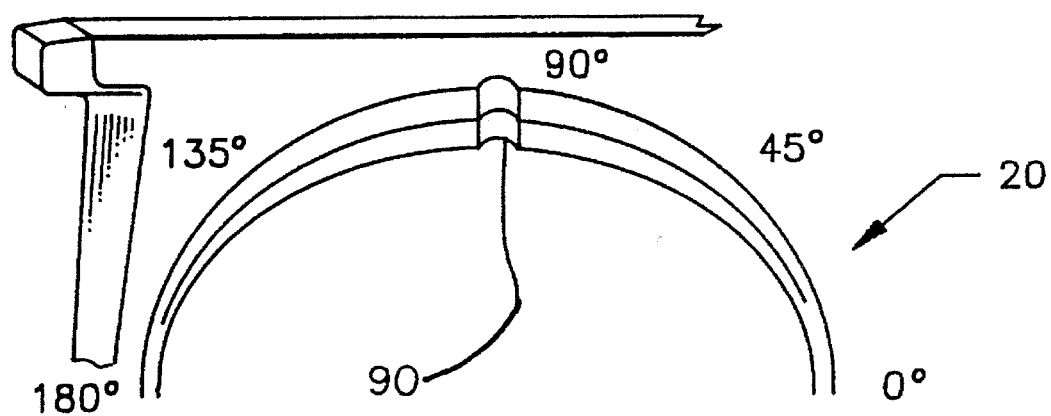
FIG. 3 is a perspective view of a portion of a modified frame embodying the invention.

FIG. 1 shows an eyeglass frame assembly 10 including left and right lens receiving portions 20 and 30, respectively, each of which has a temple 32, 34 secured thereto. The lens receiving portions are generally circular in shape. The right lens receiving portion 30 has an upper generally arcuate rim 40 and the left lens receiving portion has an upper generally arcuate rim 42.

The inner end 44 of the upper rim 40 of the right lens receiving portion 30 has a relatively short projecting pin 50 and the inner end 46 of the upper rim 42 of the left lens receiving portion 20 has a relatively short pin 52. The pins 50 and 52 are preferably aligned on a common axis, the horizontal axis.

The frame assembly 10 also includes a coupling member 60 which is a short tube having a through hole 62 dimensioned to receive the pins 50 and 52. The coupling member 60 also has a second through hole 64 adapted to receive left and right nose pieces 70 and 72, respectively, Each nose piece has a curved portion 74 and 76, respectively, which rests on the nose and the upper end of each nose piece carries a pin, 78 and 80, respectively, which enter the second through hole 64.

In using the invention, to fit a particular patient, the technician selects left and right lens receiving portions 20 and 30 and then he need only select a coupling member 60 to provide the required spacing of the nose pieces 70 and 72 and he assembles the nose pieces 70 and 72 and the lens receiving portions with the coupling member 60.

It is noted that off the shelf standard frames knormally available in urban areas cannot have their lens receiving portions adjusted for different pupillary distances. The present invention permits such adjustment by proper selection of the size of the cylinder 60 whereby the lens receiving portions can be selectively spaced from each other.

Figure 4:
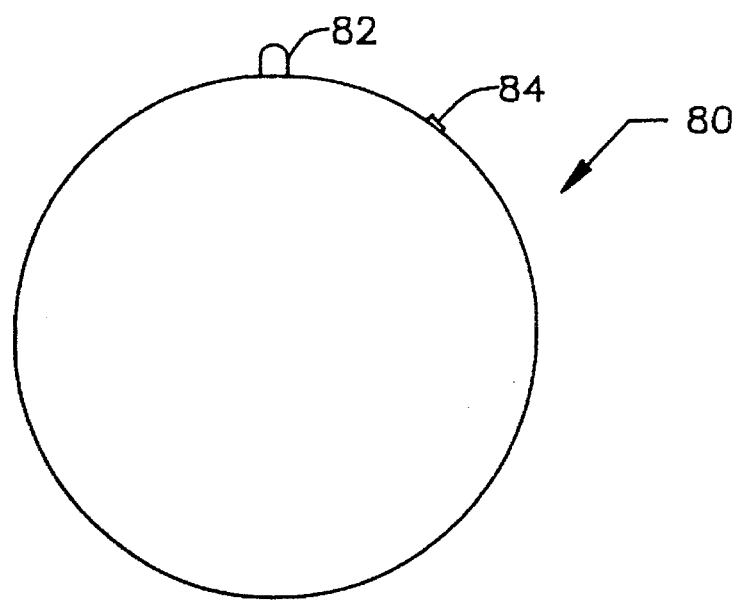
FIG. 4 is a front elevational view of a lens to be used with a frame embodying the invention.
Figure 5:
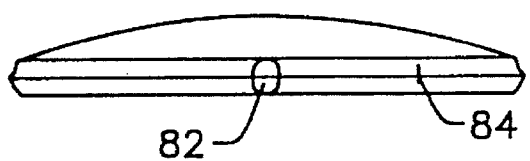
FIG. 5 is a side elevational view of the lens of FIG. 4.

In another aspect of the invention, an eyeglass frame is created to permit the positioning in the frame of lenses which must be rotated to correct for astigmatism. In this embodiment of the invention, the frame assembly 10 is intended for use with circular lenses 80 (FIGS. 4 and 5) which are molded and in the molding process are provided with a stub 82 positioned on a selected axis of the lens. The lens is also provided along its periphery with a degree marking 84 suitably positioned so that it can be used to position the lens in a frame as required.

In this case, the inner surface of the lens receiving portion 20 and 30 of the frame 10, facing the wearer, is provided with a notch 90 at 90 degrees and a plurality of degree markings 92 spaced apart every 10 or 15 degrees. With this arrangement, a cylinder lens 80 can be rotated to its proper axis and then fixed in place in the frame.

Figure 6:
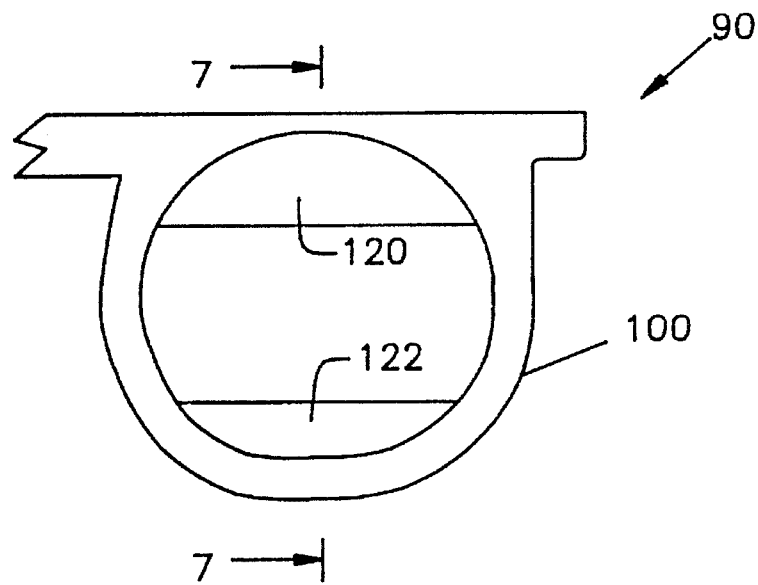
FIG. 6 is a front elevational view of a portion of a modified frame embodying the invention.
Figure 7:
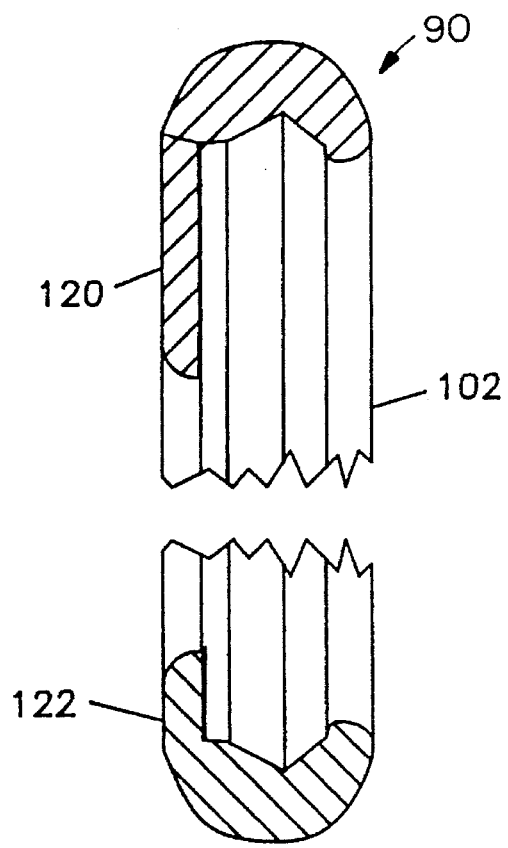
FIG. 7 is a sectional view along the lines 7—7 in FIG. 6.

In a modification of the invention illustrated in FIGS. 6 and 7, a frame 90 is created to accept a circular lens 94 while providing, to the outside world, a non-circular lens opening which is more esthetic or stylish than a circular lens opening might be. In this modification, the lens receiving portion 100 of the frame, which is on the wearer side of the frame has a circular depression 102 for receiving a circular lens, however, the front of the frame which faces the world is provided with lips or wall portions 120 and 122 which make the lens opening non-circular from the front. The portions 120 and 122 can having any desired shape to provide a desired lens opening as seen from the front.

What is claimed is:

1. A modular univeral eyeglass frame comprising
    a first lens receiving portion,
    a second lens receiving portion,
    said first lens receiving portion having an upper rim,
    said second lens receiving portion having an upper rim,
    a coupling member disposed between said first and second lens receiving portions,
    said first and second lens receiving portions removably coupled to said coupling member, and
    left and right nose pieces removably coupled to said coupling member.

2. The device defined in claim 1 wherein
    said first lens receiving portion has a post inserted into said coupling member,
    said second lens receiving portion has a post inserted into said coupling member, and
    said left and right nose pieces each has a post inserted in said coupling member.

3. The device defined in claim 1 wherein
    said coupling member has a through hole having a first end and a second end,
    said first lens receiving portion has a post removably inserted into said first end of said through hole in said coupling member
    said second lens receiving portion has a post removably inserted into said second end of said coupling member,
    said left nose piece has a post removably inserted into a hole in said coupling member and said right nose piece has a post removably inserted into a hole in said coupling member.

4. A modular univeral eyeglass frame comprising a first lens receiving portion, a second lens receiving portion, said first lens receiving portion having an upper rim and a lateral mounting post, said second lens receiving portion having an upper rim and a lateral mounting post, a coupling member disposed between said first and second lens receiving portions, said coupling member being selected from a group of coupling members of different lengths to provide a desired spacing between parts coupled to said coupling member, said coupling member having first and second ends, first and second holes in said first end of said ocupling member and third and fourth holes in said second end of said coupling member, said first lens receiving portion having its lateral pin removably and adjustably inserted in said first hole in said coupling member and second lens receiving portion having its lateral pin removably and adjustably inserted in said third hole in said coupling member to provide a desired spacing beteween said first and second lens receiving portions determined by the length of said coupling member, and a left nose piece having a pin removably and adjustably inserted in said second hole in said coupling member and a right nose piece having a pin removably and adjustably inserted in said fourth hole in said coupling member.

\* \* \* \* \*